July 11, 1933.  H. D. WEED  1,917,744
TREAD MEMBER FOR TIRE CHAINS
Filed Sept. 8, 1932  2 Sheets-Sheet 1
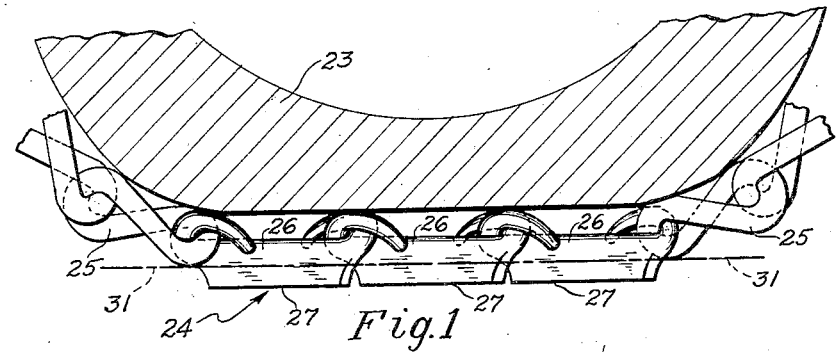
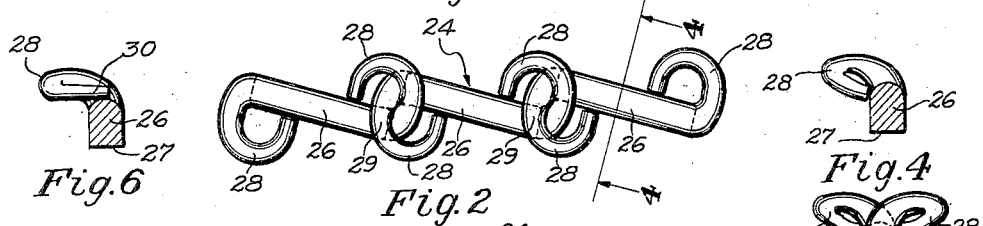
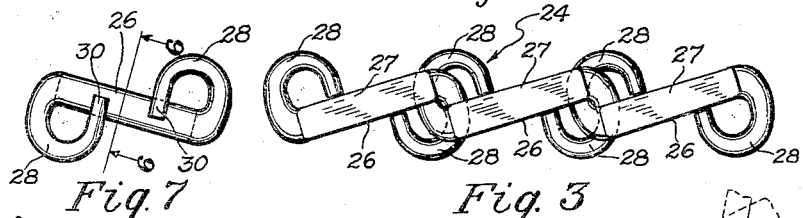
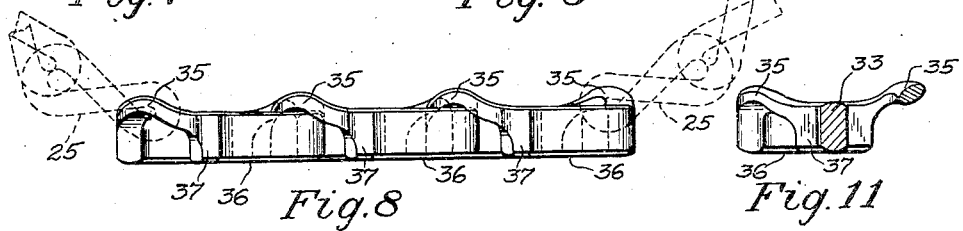
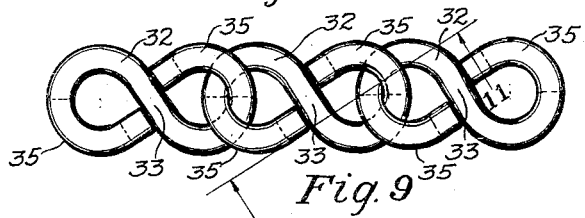
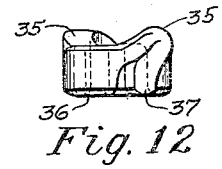
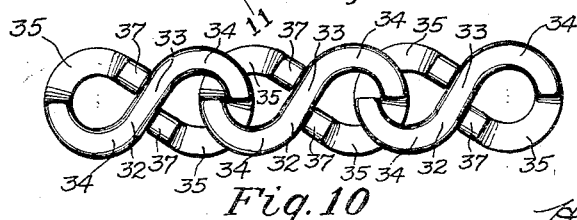
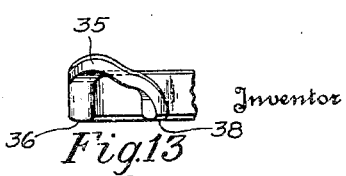
Inventor
Harry D. Weed
By Wooster & Davis
Attorneys July 11, 1933. H. D. WEED 1,917,744
TREAD MEMBER FOR TIRE CHAINS
Filed Sept. 8, 1932 2 Sheets-Sheet 2
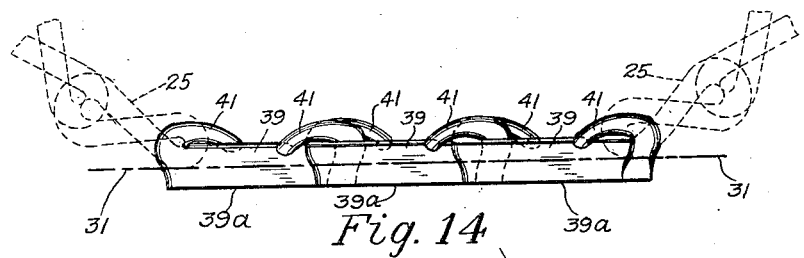
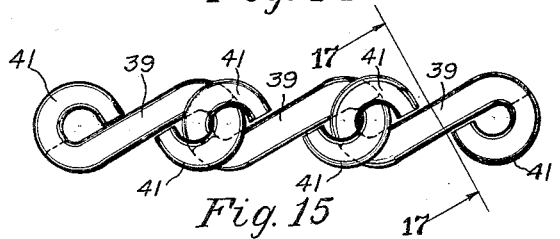
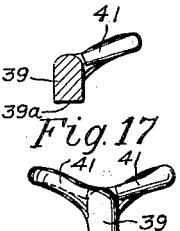
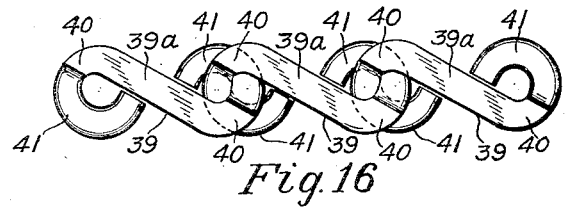
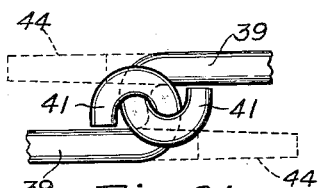
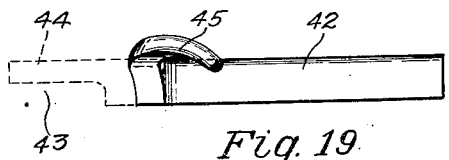
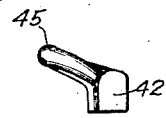
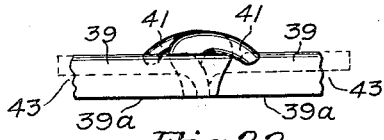
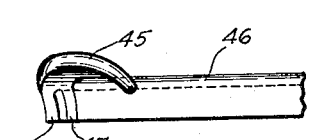
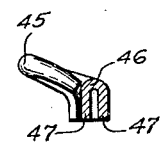
Inventor
Harry D. Weed
By Wooster & Davis
Attorneys Patented July 11, 1933

1,917,744

UNITED STATES PATENT OFFICE

HARRY D. WEED, OF SOUTHPORT, CONNECTICUT

TREAD MEMBER FOR TIRE CHAINS

Application filed September 8, 1932. Serial No. 632,093.

This invention relates to a cross member for anti-skid tire chains. It has for an object to provide such a member of an improved and simplified construction so that it will be easier to make and will require less material, and therefore can be manufactured at less cost.

It is another object of the invention to provide a construction which will have a better grip on the road and thus will have increased anti-skid properties over the ordinary type of chain.

Another object of the invention is to provide a cross member in which a relatively large amount of the metal of the links of which the member is composed is located where it engages the road and therefore takes the wear before the connecting elements of the link are worn by engagement with the road surface and the links thus have longer life.

Still another object of the invention is to provide a cross member in which the individual links comprise only a single central portion or bar arranged to secure maximum traction, and in which the links are connected by simple loops which are supported by the central section or bar so that they are not crushed down by the weight of the car, and furthermore, are so located that they provide a wide bearing on the surface of the tire to prevent rocking of the links.

With the foregoing and other objects in view the invention consists in certain novel features of construction, combination and arrangement of elements as will be more fully disclosed in connection with the accompanying drawings. In these drawings various forms of the invention are shown, but it is to be understood that I am not limited to the exact details of construction illustrated but may use various modifications without departing from the principle and scope of the invention.

In the accompanying drawings:

Fig. 1 is a cross section of the lower portion of a tire showing a cross member involving my invention in a side elevation;

Fig. 2 is a top plan view of the tread links of the cross member;

Fig. 3 is a bottom plan view thereof;

Fig. 4 is a cross section of a link substantially on line 4—4 of Fig. 2;

Fig. 5 is an end view of the link;

Fig. 6 is a transverse section substantially on line 6—6 of Fig. 7;

Fig. 7 is a top plan view of a slightly modified construction of link;

Fig. 8 is a side elevation of the tread links of the cross member showing a modified construction;

Fig. 9 is a top plan view thereof;

Fig. 10 is a bottom plan view thereof;

Fig. 11 is a transverse section substantially on line 11—11 of Fig. 9;

Fig. 12 is an end view of the link shown in Figs. 8 and 10;

Fig. 13 is a side elevation of one end of a link similar to those in Figs. 8 to 10 but showing a slight modification;

Fig. 14 is a side elevation of the tread portion of a cross member of another modified construction of link;

Fig. 15 is a top plan view thereof;

Fig. 16 is a bottom plan view thereof;

Fig. 17 is a cross section of a link substantially on line 17—17 of Fig. 15;

Fig. 18 is an end view of the links of Figs. 14 to 16;

Fig. 19 is a side elevation of a partially formed link showing the first steps of one method which may be employed for making the links;

Fig. 20 is an end elevation thereof looking from the right of Fig. 19;

Fig. 21 is a top plan view illustrating the steps of connecting two connected links;

Fig. 22 is a side elevation thereof;

Fig. 23 is a section through a link showing how it may be formed from sheet metal; and Fig. 24 is a side elevation of this link partly completed.

Referring first to the form of device shown in Figs. 1 to 5, a section of a tire is indicated at 23 and the cross member of the anti-skid chain as illustrated comprises any desired number of tread links 24, in the present case three being used, and twisted side links 25 for connecting the cross member to the side chains, not shown, extending around the periphery of the tire at the opposite side thereof.

My invention relates principally to the tread links. In the modern conditions of operation of automobiles at high speed, portions of the chains are rapidly worn resulting in early breakage due to wear on the hard surface of the road and also pounding of the links on the hard surface because of these high speeds. To meet these conditions I have provided an improved link construction in which a relatively large amount of wearing material is provided on the portions of the link which engage the road surface and have located the connections for adjacent links above these wearing portions so that they do not engage the road surface. My improved links also instead of comprising a continuous connected loop having two spaced side portions, as is the usual construction, comprises but a single central portion or bar with connecting loops at its opposite ends, thus greatly simplifying the construction of the links, and also making the link much simpler and easier to manufacture. The additional wearing material greatly increases the life of the links as does also the fact that the connecting portions between adjacent links cannot be weakened by wear with the road surface until the additional wearing or tread portions have been worn off. I also so locate the connecting loops with respect to the single central portion or bar that they extend over this portion or bar of the adjacent links so that they are supported thereby and are thus prevented from being crushed down by the weight of the car.

As shown, each of the links 24 comprise a single central portion or bar 26. This may be of different cross sections, but it is preferably substantially rectangular, as shown, as this gives a good tread or bearing surface 27 and also permits making of the links from simple bar stock. The opposite end portions of the link are reduced in height as compared to that of the central portion, are preferably located at the upper edge of the central portion and are bent laterally to form connecting loops 28. As indicated, these reduced end portions of a given link are bent laterally in opposite directions, or that is on the opposite sides of the central or bar portion 26, and are interconnected with a similar loop on the opposite side of an adjacent link. It will be clear from the drawings that the central portion or bar 26 of each link extends under the overlapping portion 29 of the loop of the adjacent link so that this loop is supported directly on the top of the central portion or bar 26 and therefore cannot be crushed down by pressure from the tire. To secure this effect the loops are also preferably bent upwardly above the top edge of the central portion or bar which still further removes these loops from the surface of the road. They also provide nubs above the top edge of the link to embed themselves in the surface of the tire to increase the holding effect between the tire and the links.

It will also be evident from these figures of the drawings, and particularly of Figure 5, that as the loops 28 are bent laterally in opposite directions from, or that is, to the opposite sides of the central portion or bar 26, they provide a wide bearing surface on the tire which effectively prevents rocking of the links on the road surface. It will further be evident from the drawings that this construction of the links and means of securing them together positions the central portions or bars 26 so that they do not lie in longitudinal alignment but are inclined at an angle laterally to the longitudinal axis of the connecting member although the road engaging surfaces 27 lie in substantially the same plane. They thus give a large traction or gripping effect on the road both laterally and longitudinally, and this arrangement also assists in preventing rocking of the links.

The reduced end portions 28 may be of any desired shape in cross section, that is, they may be round, or as shown somewhat flattened, so as to be oval in cross section with the widest diameter in the horizontal plane, thus increasing their resistance to straightening out under tension on the link.

In Figs. 1 to 5 the ends of the loops 28 are shown as located adjacent the sides of bar portions 26 but if preferred these end portions may be made somewhat longer and extended over the top of the central or bar portion 26 so as to be supported thereby, as indicated at 30 in Figures 6 and 7. With this construction not only are the loops supported where they overlap the adjacent link but the free ends of the loops are also supported by the central or bar portion of the link of which the loops are a part.

It will be seen that in these constructions the twisted connecting links 25 and also the connecting loops 28 are well above the tread or road engaging portion 27 as indicated by the dotted line 31. It will also be evident that this provides a large amount of wearing material below these connecting links and loops which must be worn off before the links 25 or the loops 28 engage the road surface to be worn thereby, and therefore the links can stand a large amount of wear and extended use before they are weakened.

In the form shown in Figs. 1 to 7 the central portion or bar 26 is shown as being straight, but I am not limited to this construction. Thus in Figures 8 to 13 the single central portion or bar 32 has a substantially short straight central portion 33 and then the central portion or bar is bent to form loops so that the tread 34 is substantially S-shape. This form, however, also has the reduced end portions 35 at the opposite ends of the central or bar portion 32 which are bent laterally to complete the connecting loops for connecting the links together. It will also be apparent that this reduced loop portion 35 when the links are connected passes over the top of the central or bar portion 32 so as to be supported thereby the same as in the first form. Further, the free end portions of the loop may be enlarged and extended downwardly to the level of the tread surface 36 as indicated at 37 to provide an additional support for the free end of the reduced end portion 35 and also to increase the gripping and wearing surface on the road. In other words, in these links the stock is reduced near the end as indicated at 35 and the reduced portion bent upward to pass over the unreduced portion of the adjacent link, and the unreduced portion 37 at the end provides extra wearing surface. In other respects these links are practically the same as those of Figs. 1 to 7.

In Fig. 13 there is shown a slight modification in which instead of enlarging the end of the reduced end portion 35 as in Figs. 8 to 12, the free end of this reduced end portion is merely extended down to the level of the tread surface 36 as shown at 38 so as to provide a support for the free end of the reduced end portion.

In the modification shown in Figs. 14 to 18 the link has a shape intermediate that of the first form, Figs. 1 to 7, and that of Figs. 8 to 13. In this form the central or bar portion 39 is straight for the greater portion of its length but at its opposite ends is curved laterally in opposite directions as indicated at 40. Thus this central or bar portion is relatively longer than the corresponding portion 26 of the form of Figs. 1 to 7, but relatively shorter than the central or bar portion 32 of the form of Figs. 8 to 13. Thus while the ends of the straight bar of Figs. 1 to 7 may not overlap as indicated in Fig. 3 they do overlap in this form as clearly shown in Fig. 16. Thus for a given total length of link this gives a greater bearing or gripping surface on the road surface increasing the amount of wearing material and traction to that extent. In general this central portion or bar is substantially S-shaped, and the tread or road engaging surface is indicated at 39a. In this form of link as in the other forms there are reduced end portions 41 bent upwardly above the top edge of the central or bar portion 39 and laterally to form connecting loops as in the first form. Also in this form the reduced loop portion passes over the top or overlaps the central or bar portion 39 of an adjacent link the same as in the other forms so as to be supported thereby. In all cases the reduced loop portions are raised a material distance above the road engaging or tread surface so that a large amount of wear and use is permitted before these connecting loops or the connecting links 25 engage the road surface. In this form also the free end of the loop 41 may be extended over the central or bar portion 39 to be supported thereby as indicated in Figs. 6 and 7. It will be evident from the drawings each of the forms of links shown is of general S-shape.

There are numerous ways in which these links can be formed, but it will be evident that as they comprise a single central portion or bar with connecting loops at the opposite ends of the bar they are of very simple construction and much easier to make than the old form of oval link. Thus as shown in Figs. 19 to 22, a piece of rectangular bar stock 42 may be reduced at its opposite ends by cutting out a portion 43 to provide a reduced extension 44 at the upper edge of the bar, or blanks can be cut from a bar rolled to this shape in cross section. This reduced end portion can then be forged and bent upwardly and laterally as indicated at 45 to produce the connecting loops 28, 35 and 41.

As indicated in Figs. 23 and 24, the link may be formed by folding sheet metal of suitable gauge to form the central portion 46 corresponding to the central portion of the other forms. The sides 47 may be folded together or left spaced apart as desired.

It will be noted from the drawings that if the central portion or bar 26, 32 and 39 of the links are made of substantially rectangular cross section the cross section of this portion on any plane parallel to the tread or wearing surface 27, 34 or 39a is of substantially the same shape and size as this tread and therefore the wearing or tread surface remains substantially the same throughout the life of the link.

It will be evident that these links can be readily manufactured and shaped to the proper form and that as the connecting loops and the connecting links are located a material distance above the tread or bearing surface the chain can be subjected to extended use and wear before there is any chance of the connecting loop portions or the attaching twisted links engaging the road surface and being worn thereby so as to be weakened. The chain can therefore be used much longer than the ordinary constructions before breaking and therefore the life of the chain is greatly increased. Furthermore, the shape of the surface engaging the road remains substantially the same throughout the life of the link and therefore the gripping or anti-skid value remains substantially the same or uniform throughout the life of the link. This is a great improvement over prior links where nubs or projections quickly wear off to reduce the anti-skid value. Also it will be noted that the weaker portions of the link, that is, the reduced ends or loops, are directly supported by the stronger central or bar portion so that additional strength is secured.

Although the looped end portions may be formed integral with the central portion of the link they may be welded thereto or secured by any other suitable means.

Having thus set forth the nature of my invention, what I claim is:

1. A tire chain cross member comprising a plurality of connected links each comprising a single central road engaging portion with reduced end portions at the upper edge thereof bent into a loop connected with a similar loop of the adjacent link.

2. A tire chain cross member comprising a plurality of connected links each comprising a single road engaging bar having a looped end portion extending over the bar of an adjacent link so as to be supported thereby and the intermediate portion of the bar being of greater height than the overlapped portion to provide additional wearing material.

3. A tire chain cross member comprising a plurality of single bar links connected by loops at their ends, the body of the bar being of greater thickness in the vertical direction than the loops and extending under the overlapping portion of the loop of an adjacent link to support it.

4. A tire chain cross member comprising a plurality of links each comprising a single central road engaging section and looped end portions overlapping the end portions of adjacent links, the central portions being of greater height than the end portions to provide additional wearing material and extending under the overlapping loops to provide a support therefor.

5. A tire chain cross member comprising a plurality of links each comprising a single central section and looped end portions connected with similar loops of adjacent links, said central sections having ground engaging portions extending under the loops of adjacent links to provide a support therefor.

6. A tire chain cross member comprising a plurality of links, said links each comprising a single central road engaging section having end portions of less height than the central section bent into loops interconnected with similar loops of adjacent links, and reduced portions of said loops being extended over and supported by the unreduced road engaging portion of adjacent links.

7. A tire chain cross member comprising a plurality of links connected at their ends, said links each comprising a single central road engaging section having looped end portions of less height than the central section supported by the unreduced road engaging portion of adjacent links.

8. A tire chain cross member comprising a plurality of connected links, each link comprising a single central section with reduced end portions raised above the body of the central section and bent to form attaching loops, said loops lying on and supported by the central sections of the adjacent links.

9. A tire chain cross member comprising a plurality of connected links each comprising a single central portion having looped end portions overlapping the central portion of an adjacent link so as to be supported thereby.

10. A tire chain cross member comprising a plurality of connected links, each link comprising a single central section with end portions raised above the body of the central section and bent to form attaching loops extending over and supported by the central portions of the adjacent links.

11. A tire chain cross member comprising a plurality of connected links each comprising a central road engaging bar portion curved laterally in opposite directions on opposite sides of its midsection, the end portions being reduced and bent upwardly and over the unreduced central portion of adjacent links to be supported thereby, and said links also having unreduced portions at the free ends of the reduced portions to provide a support for these free ends.

12. A link for a tire chain cross member comprising a single central road engaging section having end portions of less height than the central section bent upwardly above the central section and laterally to form attaching loops.

13. A link for a tire chain cross member comprising a single central section forming a road engaging portion and having reduced end portions at the upper edge of the section bent into loops.

14. A link for a tire chain comprising a single central section forming a road engaging portion, and reduced end portions at its upper edge bent laterally in opposite directions to form attaching loops and a wide support on a tire to prevent tipping of the link.

15. A link for a tire chain cross member comprising a central body forming a ground engaging portion and having end portions of less height than and bent upwardly above the ground engaging portion, said link also comprising looped end portions formed partly from the ground engaging portion and partly from the reduced portions.

16. A link for a tire chain cross member comprising a ground engaging portion extending substantially the whole length of the link and looped end portions, the ground engaging portion forming a part of the loops with reduced raised portions completing the loops.

17. A tire chain cross member comprising a plurality of links having connected loops and each comprising a ground engaging portion extending substantially the whole length of the link and past the ground engaging portion of the adjacent link forming an overlapping jointed tread and protecting the joints between the links from ground wear.

18. A link for a tire chain cross member comprising a ground engaging portion and looped end portions for securing to adjacent links, said looped portions being formed partly from the ground engaging portion and partly from portions of less height than the ground engaging portion, the axes of said loops extending in an upright direction relative to the ground engaging surface.

19. A tire chain cross member comprising a plurality of links each comprising a single central section having ground engaging portions spaced apart and lying in the same plane, and looped ends of less height than the central section extending over the ground engaging portions of adjacent link.

In testimony whereof I affix my signature.

HARRY D. WEED.